United States Patent

Green et al.

[15] 3,641,372
[45] Feb. 8, 1972

[54] TEMPERATURE CONTROLLED MICROCIRCUITS

[72] Inventors: Norman Green, Timonium; Harold M. Greenhouse, Baltimore; William C. Vergara, Towson; Robert L. McGill, Jr., Fallston, all of Md.

[73] Assignee: The Bendix Corporation

[22] Filed: Feb. 12, 1970

[21] Appl. No.: 10,962

[52] U.S. Cl. .......................... 307/310, 307/229, 317/235 Q
[51] Int. Cl. .................................................. H03k 17/00
[58] Field of Search .............. 307/310, 304, 229; 317/235 Q

[56] References Cited

UNITED STATES PATENTS 3,395,265  7/1968  Weir .............................. 317/235 Q
3,393,870  7/1968  Jeffrey ........................... 317/235 Q
3,383,614  5/1968  Emmons et al. ............... 317/235 Q Primary Examiner—Donald D. Forrer
Assistant Examiner—B. P. Davis
Attorney—Plante, Arens, Hartz, Smith & Thompson, Bruce L. Lamb and William G. Christoforo

[57] ABSTRACT

A circuit for stabilizing the temperature of a microcircuit substrate at a constant value includes a sensor in the form of a resistance bridge comprised of both positive and negative temperature coefficient resistors, a control circuit connected across a first set of bridge diagonal points which is powered by the bridge unbalance voltage across these points, and a heater circuit which optionally includes a current limiting device and which is connected across a second set of bridge diagonal points, the heater circuit being controlled by action of the control circuit.

14 Claims, 9 Drawing Figures

PATENTED FEB 8 1972 3,641,372

INVENTORS
NORMAN GREEN
HAROLD M. GREENHOUSE
WILLIAM C. VERGARA
ROBERT L. McGILL, JR.

BY *William G. Christoforo*
ATTORNEY

INVENTORS
NORMAN GREEN
HAROLD M. GREENHOUSE
WILLIAM C. VERGARA
ROBERT L. McGILL, JR.
BY
*William G. Christoforo*
ATTORNEY

TEMPERATURE CONTROLLED MICROCIRCUITS

BACKGROUND OF THE INVENTION

This invention relates to temperature stabilized microcircuit substrates and more particularly to miniaturized means for stabilizing the temperature of said substrates including sensing means and power dissipation means which may be mounted directly to the substrate.

The temperature dependence of solid-state devices and consequently of the circuits which they comprise is well known. In many applications the accuracy and the operational characteristics of some circuits are substantially degraded by even slight variations in the temperature of the solid-state components utilized in the circuits. For this reason, various means have been devised for maintaining the solid-state components at a relatively constant temperature. One of the obvious schemes consists of means controlling the external environment of the package containing the sensitive components, typically an oven. Recent efforts directed towards miniaturizing and subminiaturizing solid state and other type circuitry have led to corresponding efforts to provide miniaturized means for controlling the temperature environment of the circuit by including a temperature sensor and thereby controlled heater directly on the substrate of the miniaturized circuit. One particularly effective control circuit includes both positive and negative temperature coefficient devices usually arranged in a bridge configuration which is balanced at the desired substrate temperature and whose unbalance provides a control current for controlling heating devices, typically solid-state devices. Both the bridge heater devices and the sensor are miniaturized and attached to the substrate. In certain of the prior art devices, however, the current gain between the current flowing in the sensing and control circuit to the current flowing in the heater circuit has been so small that a portion of the heating is accomplished in the sensor circuit. This results in heating of the substrate in the vicinity of the sensing elements and thus masks from the sensing elements the true underlying temperature of the substrate.

SUMMARY OF THE INVENTION

Accordingly, readily miniaturized means for controlling the temperature of a microcircuit substrate has been devised which includes a temperature sensor, control circuitry and heater circuitry wherein the current drawn through the sensing circuitry is very much smaller than current drawn by the heater circuitry, so that the power dissipated in the sensors is insignificant with respect to the power dissipated in the heater circuitry. This is accomplished by providing a miniaturized temperature sensor circuit which is attached to a substrate along with circuitry whose temperature is to be stabilized. The sensor circuit develops an error signal whenever substrate temperature deviates from desired temperature. A high gain control circuit senses the error signal and modulates current through a heater circuit.

It is thus an object of this invention to provide a circuit for controlling the temperature of solid-state circuitry elements.

It is another object of this invention to provide such a circuit which is amenable to fabrication by microcircuitry techniques.

It is still another object of this invention to provide such a circuit which includes a temperature responsive sensor circuit connected directly to a circuit substrate and which dissipates negligible power.

It is still one further object of this invention to provide a temperature stabilized microcircuit substrate including a solid state heater means connected directly to the substrate.

One more object of this invention is to provide a temperature stabilized substrate of the type described having current limiting means connected serially with the substrate heaters.

Further objects, features and advantages of the invention will become apparent in the following description and claims when read in view of the accompanying drawings, wherein like numbers indicate like parts.

DESCRIPTION OF THE PREFERRED EMBODIMENT

Figure 1:
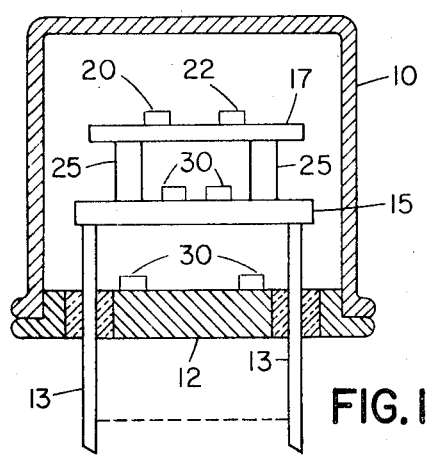
FIG. 1 is a cross-sectional view of a semiconductor device incorporating the invention.

Referring to FIG. 1 there is seen the envelope in which a temperature controlled substrate and associated microcircuitry might suitably be mounted, the envelope, for example, comprising a standard TO—8 semiconductor package and including a cap 10 and a header 12 having a plurality of leads 13 extending therethrough and being hermetically sealed therein. This type of package is well known in the art and need not be described further at this time. The fact that the temperature controlled substrate is shown packaged in this manner is not intended to limit the scope of the invention as it should become obvious as the description proceeds that the package does not comprise the present invention. Continuing with the description, a substrate 15, which in this case is not temperature stabilized, is mounted on the header, conveniently on leads 13 thereof. A temperature controlled substrate 17 suitably fabricated of a material having good thermal and electrical conductivity, for example gold-plated copper, has mounted thereon means for stabilizing the temperature thereof 20 and various other components which are sensitive to temperature change and whose temperature is to be stabilized, for example, components 22. Substrate 17 is mounted on substrate 15 by means of spacers 25 which have a high thermal resistivity, suitably glass. Those components 30 that need not be temperature stabilized are conveniently mounted either on substrate 15 or on header 12. It should be obvious that to minimize the power requirement of the temperature control means 20 which includes a heater circuit, the thermal resistance between the temperature control substrate 17 and ambient must in general be maximized, however, with the limitation imposed by the power dissipation of circuit 22 considered.

Figure 2:
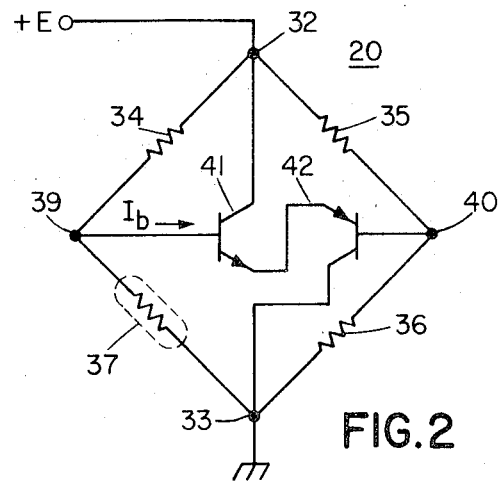
FIG. 2 is a schematic of a simplified embodiment of the invention which is useful for showing the underlying mathematical theory of the invention.

Referring now to FIG. 2 there is seen a schematic of the temperature control means 20 which includes a temperature sensor which is connected across a power source of +E volts, not shown, at terminals 32 and 33 and which at a predetermined temperature is balanced across diagonal points 39 and 40. In this embodiment the temperature sensor is comprised of the resistance bridge which includes resistors 34, 35, 36 and 37, at least one of which resistors, for example 37, is comprised of a negative temperature coefficient element, suitably a thermistor. At all other temperatures other than the aforesaid predetermined temperature, the bridge is unbalanced so that a potential difference exists across points 39 and 40. The most convenient form of the bridge is with all bridge resistors equal at the aforesaid predetermined temperature, and with the aforesaid predetermined temperature equal to the temperature at which it is desired to stabilize the substrate. A pair of oppositely poled transistors 41 and 42 have their collector to emitter circuits serially connected with one another across bridge points 32 and 33 with the base of transistor 41 being connected to bridge point 39 and the base of transistor 42 being connected to bridge point 40. In this figure transistors and 42 comprise both the control and heater circuits of the temperature stabilization means. All the circuit elements of the temperature stabilization means 20 are preferably attached by known microcircuitry techniques to the temperature stabilized substrate.

When the bridge is unbalanced, a current $I_b$ will flow between bridge point 39 and bridge point 40 through the base emitter diodes of transistors 41 and 42. So long as the substrate temperature remains constant this current will remain constant. However, as the value of the bridge elements change in response to temperature changes in the substrate, the current flow $I_b$ will change.

The theoretical temperature stability of an electrically controlled heated substrate may be calculated as follows: letting $t =$ substrate temperature
$T =$ ambient temperature
$\phi_{SA} =$ substrate to ambient thermal resistance
$P =$ total circuit power
Then $$t = T + P\phi_{SA}$$

$$\frac{dt}{dT} = 1 + \frac{dP}{dT}\phi_{SA}$$

multiplying by $dt/dt$ and rearranging terms $$1 = \frac{dt}{dT} - \frac{dP}{dt}\frac{dt}{dT}\phi_{SA} = \frac{dt}{dT}\left(1 - \frac{dP}{dt}\phi_{SA}\right) \frac{dt}{dT} = \frac{1}{1-\frac{dP}{dt}}\phi_{SA}$$

(1)

Equation (1) shows that the temperature stability of the substrate is dependent upon the factor $dP/dt$. This factor is a measure of the gain of stabilization circuit 20.

Referring again to FIG. 2, it should be noted that with current flowing through the resistive bridge, the $I^2R$ loss in resistors 34 to 37 also contributes to the heating of the substrate. However, because of their unloaded condition the power dissipation in transistors 41 and 42 greatly exceeds the total power dissipation in the four resistors as will be explained in greater detail below and therefore the latter power contributes a minimum of heat toward stabilizing the temperature of the substrate.

Figure 3:
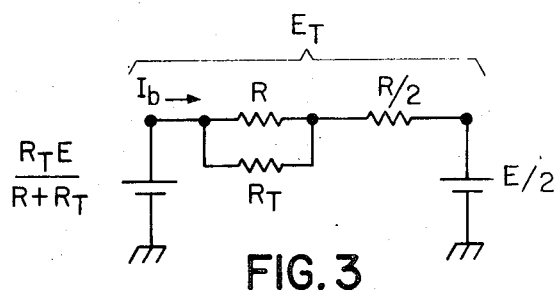
FIG. 3 is an equivalent circuit of schematic of FIG. 2.

If the resistances of resistors 34, 35 and 36 are each equal to $R$ at the desired substrate temperature $t$ and the resistance of thermistor 37 is equal to $R_T$, the equivalent circuit for the circuit of FIG. 2 is as shown in FIG. 3, where the base emitter diode voltage drops of transistors 41 and 42 are assumed to be zero. FIG. 3 shows two opposing voltages $E/2$ and $R_T E/(R+R_T)$ resulting in a current flow $I_b$, which is the base current of transistors 42 and 41 of FIG. 2. The total voltage $E_T$ across the bridge is thus:

$$E_T = \frac{E}{2} - \frac{R_T E}{R+R_T} = \frac{E(R+R_T) - 2R_T E}{2(R+R_T)}$$

$$E_T = \frac{E(R-R_T)}{2(R+R_T)} \quad (2)$$

where $E$ is applied voltage across points 32 and 33 of FIG. 2.

If $R_T$ approximately equals $R$ at temperature $t$ Equation (2) can be approximately written, within acceptable accuracy, as:

$$E_T = (E(R-R_T)/4R) \quad (3)$$

and the change in base current $I_b$ can then be determined as $$I_b = E_T/R = (E(R-R_T)/4R^2) \quad (4)$$

Figure 4:
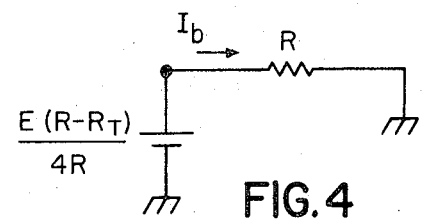
FIG. 4 is a further simplification of the above equivalent circuit.

FIG. 3 can thus be simplified as shown in FIG. 4.
Differentiating Equation (4) with respect to $R_T$ yields:

$$dI_b/dR_T = E/4R^2 \quad (5)$$

Assuming the betas of transistors 41 and 42 are equal, which can easily be a design feature, total power dissipation will be:

$$P = \beta E I_b$$

therefore $$I_b = P/\beta E \quad (6)$$

Rearranging Equation (5) as:

$$dI_b = \frac{E}{4R^2} dR_T \quad (7)$$

Combining Equations (6) and (7) yields:
$$dP/dR_T = \beta E^2/4R^2 \quad (8)$$

Thermistor $R_T$ has a linear temperature coefficient for small temperature changes and therefore its curve of $R_T$ versus temperature can be assumed to be a constant value $-K_T$ for small temperature changes. Therefore:

$$dR_T/dt = -K_T. \quad (9)$$

The power dissipation of temperature stabilization circuit 20 (FIG. 2) is dependent upon the characteristic of thermistor $R_T$, thus combining Equations (8) and (9) yields:

$$dP/dt = (-E^2 \beta K_T)(4R^2). \quad (10)$$

The temperature stability of substrate 13 as expressed in Equation (1) can now be expressed in terms of the circuit parameters. Therefore substituting Equation (10) into equation (1) yields:

$$\frac{dt}{dT} = \frac{1}{1 + \frac{E^2 \beta K_T}{4R^2}\phi_{SA}} \quad (11)$$

$$\frac{dt}{dT} = \frac{4R^2}{4R^2 + E^2 \beta K_T \phi_{SA}} \quad (12)$$

Equation (12) shows that the temperature stability of the stabilized substrate is dependent upon the values of the circuit parameters, as well as the gain $\beta$ of transistors 41 and 42. However, because $\beta$ has the greatest magnitude it is the primary contributor to dissipated heat. This is reflected into Equation (12) by considering the equality of Equation (8). The variation of Equation (12) is primarily caused by $K_T$ which as seen from Equation (9) is dependent upon $dR_T$. The temperature of substrate 12 is thus controlled by changes in the resistive value of $R_T$. It is also seen that the current drawn through the sensors is in the neighborhood of $I_b$ while the collector current drawn through transistors 41 and 42 is $\beta I_b$. Since $\beta$ is generally greater than 100 it has been shown that for this simple form of the invention the heater current is much greater than sensor current.

Figure 5:
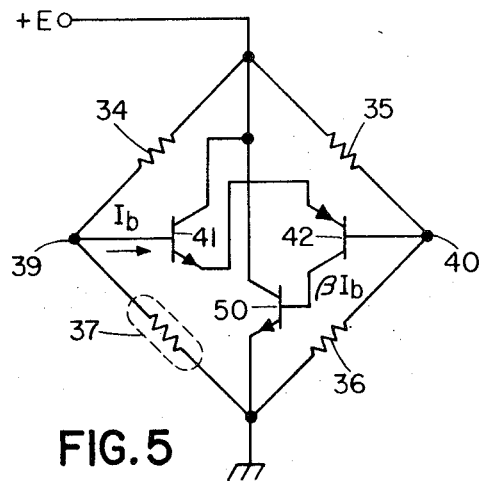
FIG. 5 is a schematic showing a more practical version of the invention.

The embodiment of FIG. 5 is a modification of the embodiment shown in FIG. 2 and is identical thereto except for the addition of the third transistor 50. The additional transistor is used primarily to increase the circuit gain, that is, to increase the power dissipated by the transistors and to thus decrease the current drawn by the sensors. It can be seen that since transistors 41 and 42 collector current is equal to $\beta I_b$, the collector current of transistor 50 is equal to $\beta - 2I_b$. Thus, Equation (12) can be rewritten for this further circuit as:

$$\frac{dt}{dT} = \frac{4R^2}{4R^2 + E^2 \beta^2 K_T \phi_{SA}} \quad (13)$$

Additionally, it should now be obvious that using this scheme additional transistors can be cascaded into the circuit with the collector current in the last transistor being equal generally to $\beta^{n-1} I_b$, where $n$ is the total number of transistors in the circuit. Thus, Equation (12) can be written in general form for this type of circuit as:

$$\frac{dt}{dT} = \frac{4R^2}{4R^2 + E^2 \beta^{n-1} K_T \phi_{SA}} \quad (14)$$

Figure 6:
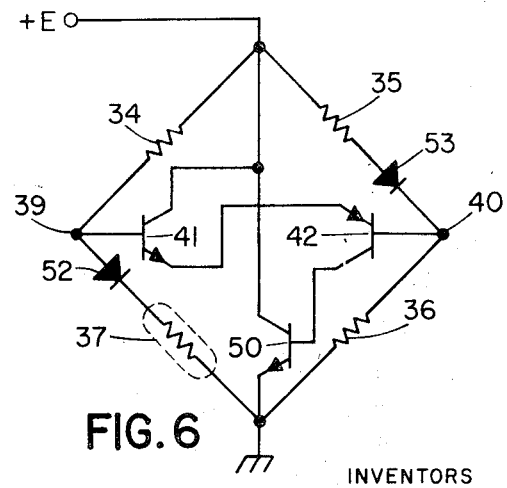
FIG. 6 is a schematic showing diodes inserted into the circuitry of FIG. 5 and which are useful for compensating temperature stability errors.

Referring now to FIG. 6 there is seen the circuit of FIG. 5 with two additional diodes, a diode 52 connected between point 39 and thermistor 37 and a diode 53 connected between resistor 35 and point 40. These diodes provide an offset voltage to compensate for the base emitter voltage drop of transistors 41 and 42 and add validity to the assumption made above that the transistor diode voltage drops in the mathematical model were zero.

Figures 7, 8:
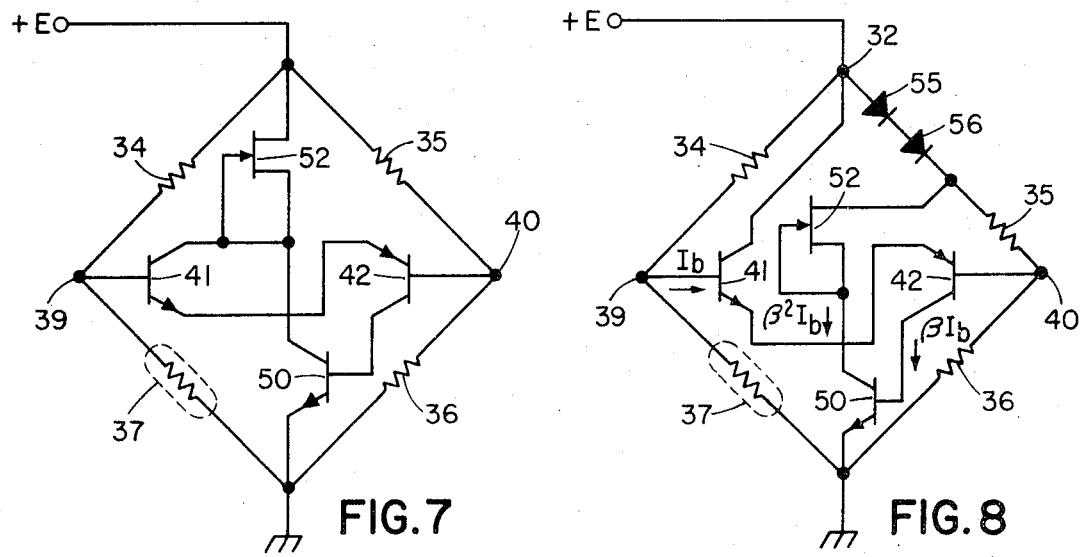
FIG 7 is a schematic of the invention including current limiter means in the heater.
FIG. 8 shows the circuit of FIG. 7 and including compensating diodes for minimizing offset error.

It should be obvious that since the temperature stabilized circuit has no capacity to cool the stabilized substrate that the stabilized substrate must at all times be at or above ambient temperature so that heat flow is from the stabilized substrate to ambient. Accordingly, the substrate operating temperature is chosen to be at or slightly above the maximum expected ambient temperature. It has been found that the circuits disclosed here will stabilize a substrate within very close temperature tolerances while ambient temperature varies over wide ranges. If, for example, the circuit of FIG. 5 were energized while ambient temperature and hence the desired stabilized substrate were at the lower end of ambient operating range of temperatures, the sensor bridge comprised of resistors 34 to 37 will be in an extreme state of unbalance and a very large current will flow through heater transistor 50 until the substrate heats towards its operating temperature which, as has been stated, is at or above the maximum ambient operating temperature. This large initial current will normally damage the semiconductor thus requiring some means of limiting the current therethrough, either internal or external current limiting means. An external current limiting means has the disadvantage of dissipating power in an external component so that this externally dissipated power is lost and hence not available for substrate temperature stabilization. The current limiting means should thus be of the type and size suitable for mounting on the substrate and additionally should limit the current when current demand is high but should permit essentially unrestricted current flow when current demand is low. In other words, the current limiter should have a nonlinear dynamic resistance characteristic. Referring now to FIG. 7 wherein there is seen the circuit of FIG. 5 including the sensor resistors 34 to 37, control transistors 41 and 42 and heater transistor 50 and wherein there has been added a current limiting means having the characteristics described above, suitably field effect transistor 52 having a source-drain circuit connected in the collector circuit transistor 50 and a gate electrode connected in the collector circuit of transistor 41. With the sensor bridge highly unbalanced transistors 41, 42 and 50 are highly conductive so that the collector of transistor 41 and hence the gate of transistor 52 is close to ground potential. Current limiting transistor 52 is chosen so that under these conditions the drain to source current therethrough can safely pass through the collector-emitter circuit of transistor 50 without damaging that latter transistor. As the temperature controlled substrate approaches operating temperature transistor 50 becomes less conductive so that the voltage drop across the drain-source electrodes of transistor 52 drops and transistor 52 now operates as a low ohm resistor and hence has negligible effect on the stabilized operation of the temperature stabilized circuit. If transistor 52 is mounted so that there is low thermal resistance between it and the substrate allowing the heat dissipated therein to be immediately transferred to the substrate, stabilization time will be decreased considerably.

Referring again to FIG. 7, a source of temperature stability error becomes apparent when it is considered that the voltage drop across diagonal 39 and 40 is equal to the sum of the base-emitter voltage drops of transistors 41 and 42 and that these voltage drops are not constant being logarithmically related to the emitter current flowing in transistors 41 and 42. The temperature stability error caused by the changing base-emitter potentials may be explained by using the principal of superposition. If it is first assumed that the base-emitter potentials are constant, then the temperature stability may be reasonably expressed by Equation (13). If the ambient temperature is lowered, then additional circuit power must be dissipated to maintain a constant substrate temperature. To generate this increased circuit power, more base current is required across diagonal 39 and 40. This additional base current is produced by a slight bridge unbalance caused by a change in the resistance of thermistor 37 and the substrate will now be at a slightly lower temperature as predicted by the stability Equation (13). The previously mentioned variation of base-emitter voltage with transistor collector current effectively introduces an additional voltage source across the bridge diagonal 39 and 40. As more power is dissipated in the bridge by transistor 50 and, to a much lesser degree, transistors 41 and 42, the increased emitter current of transistors 41 and 42 results in an increased base-emitter voltage in these transistors and hence an additional bridge unbalance. The substrate temperature will decrease until the resistance of thermistor 37 produces an additional voltage drop equal to this change in base-emitter voltage. The temperature stability error caused by this effect may be exactly cancelled by the introduction of a compensating voltage equal to the change in base-emitter voltage caused by the change in transistor emitter current. This circuit scheme is illustrated in FIG. 8, reference to which should now be made. This latter figure includes the circuit elements shown in FIG. 7 with the addition of diodes 55 and 56 which are serially connected between bridge point 32 and resistor 35 with the collector electrode of transistor 41 connected to point 32 and the drain electrode of transistor 52 connected to the anode of diode 56. As in the earlier figure, the temperature sensor is comprised of resistors 34 to 37, the control circuit is comprised of transistors 41 and 42, the heater is comprised of transistor 50 and a current limiter is comprised of transistor 52. As before, the changes in ambient temperature cause a change in current $I_b$. However, as transistor 50 collector current changes, which current is drawn through diodes 55 and 56, the diode voltage drop across these diodes changes thus causing the voltage at point 40 to change. It can be seen that the change of point 40 voltage is in the proper direction to maintain the substrate temperature stable when it is considered that an increase in ambient temperature leads to less transistor 50 collector current which is reflected by an increase in point 40 voltage and a decrease in ambient temperature leads to more transistor 50 collector current which is reflected by a decrease of point 40 voltage. This change in point 40 voltage will be exactly equal to the voltage change across points 39 and 40 so long as diodes 55 and 56 are chosen to have the same general characteristics as transistors 41 and 42, that is, that the $V_{be}$ versus emitter current characteristic curve of the transistors has a similar form as diode forward bias versus current characteristic. Since the voltage change across points 39 and 40 necessary to stabilize the substrate is now almost entirely accounted for by the voltage change at point 40, the voltage at point 39 will remain relatively constant, or in other words, the resistance of thermistor 37 will remain relatively constant so that the substrate operating temperature will correspondingly remain relatively constant.

Figure 9:
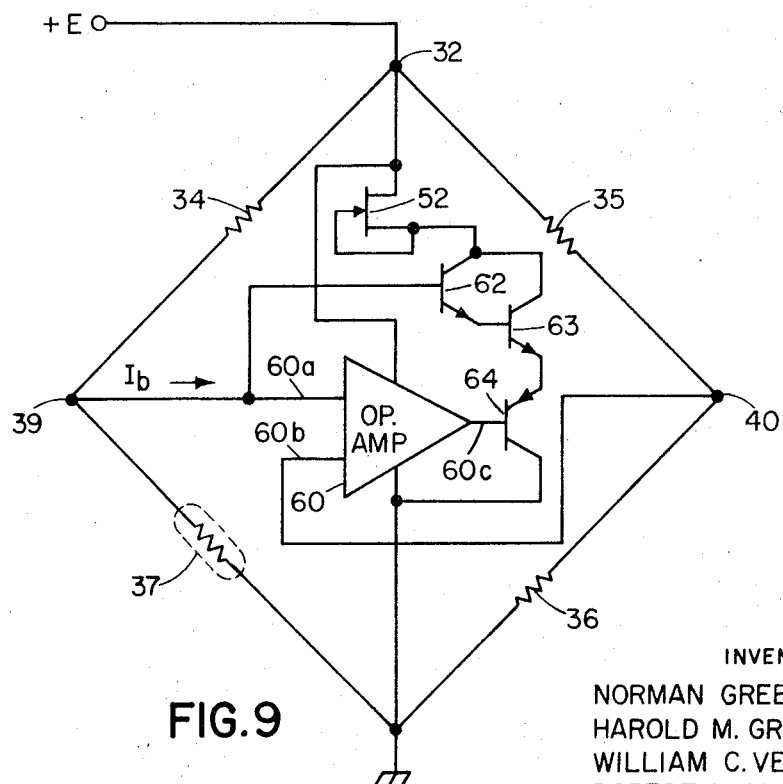
FIG. 9 is a schematic of the invention including an operational amplifier connected in the control circuitry.

Referring now to FIG. 9 there is seen a further embodiment of a circuit used to temperature stabilize a microcircuit substrate which includes the earlier temperature sensor comprised of resistors 34 to 37 and the current limiter transistor 52. An operational amplifier 60 has a first input port 60a connected to bridge point 39 and a second input port 60b connected to bridge point 40. Operational amplifiers are characterized by their high input impedance, hence negligible current is drawn from the sensors into the operational amplifier. Additionally, the operational amplifier acts to generate an error signal at its output tap 60c whenever the signals at its two input ports 60a and 60b are unequal. Bridge point 39 is connected to the base electrode of transistor 62 which is arranged in a Darlington couple configuration with transistor 63. Thus, assuming $I_b$ to be transistor 62 base drive current caused by sensor bridge unbalance, transistor 63 collector current is equal to $\beta^2 I_b$ where the $\beta$ of these two transistors is equal. Heater transistor 64 whose base electrode is connected to the operational amplifier output tap 60c has its emitter-collector circuit serially connected between the collector-emitter circuit of transistor 63 and ground, hence a maximum transistor 64 collector current $\beta^2 I_b$ is controlled by operational amplifier 60 which in turn is controlled by bridge unbalance. As before, the field effect transistor 52 operates as a current limiter, the theory of its operation being previously explained, with its drain electrode connected to bridge point 32 and its gate and source electrodes being connected in common and to the collector electrodes of the Darlington pair transistors 62 and 63.

As is well known, the voltage gain of an operational amplifier is determined by the feedback impedance between port 60a and tap 60c divided by the impedance at its input port 60a. This feedback impedance is primarily equal to the equivalent base-emitter impedance of transistors 62 and 63 which in the Darlington couple is proportional to the $\beta^2$ of the transistors, thus the voltage gain of the operational amplifier is relatively low, being proportional to $$\beta^2 r_{be} \frac{R_{34}+R_{37}}{R_{34} \times R_{37}}$$

where
$r_{be}$ is the base-emitter resistance of transistor 64
and $R_{34}$ and $R_{37}$ are the resistances of resistors 34 and 37 respectively.

On the contrary, the circuit current gain is quite high, transistor 64 collector current being proportional to $\beta^2$ as previously explained. This fact permits the circuit of FIG. 9 to provide exceptional substrate temperature stability. Additionally, the small $I_b$ current drive required to control large amounts of heater power can be produced by only very slight sensor bridge unbalance further enhancing temperature stability.

Operational amplifier 60 which is relatively temperature insensitive and which dissipates no power can be mounted on an unstabilized substrate or platform such as on substrate 15 or header 12 of FIG. 1. The other components of the circuit are either temperature sensitive or dissipate power useful for maintaining substrate temperature stability and hence are suitably mounted on the temperature stabilized substrate such as stabilized substrate 17 of FIG. 1, for example.

The invention claimed is:

1. A substrate temperature stabilizing circuit comprising:
a temperature sensor means comprised of a resistance bridge at least one arm of which includes a negative resistance coefficient element and having first and second pairs of diagonal bridge points;
an electrical power source connected across said first pair of points;
an operational amplifier connected to sense said second pair of points;
a feedback circuit comprising a plurality of base-emitter circuits of a plurality of transistors connected across said operational amplifier, said transistors comprising a high current gain amplifier, and having collector-emitter circuits connected across said electrical power source, at least one of said transistors comprising a heater for said substrate.

2. A substrate temperature stabilizing circuit as recited in claim 1 wherein said temperature sensor means and said feedback circuit are mounted in close thermal conductivity with said substrate and said operational amplifier is mounted away from said substrate.

3. A substrate temperature stabilizing circuit comprising: a resistance bridge including at least one thermistor and having first and second bridge diagonal points; high current gain means comprising oppositely poled first and second transistors having commonly connected emitter electrodes, and base electrodes connecting said transistors across said first bridge diagonal points, each said transistor having collector electrodes; and, a heater comprising a third transistor having a collector electrode and an emitter electrode comprising a collector-emitter circuit connected across said second bridge diagonal points, said third transistor collector electrode being connected to said first transistor collector electrode, and a third transistor base electrode connected to said second transistor collector electrode, and including an electrical power source connected across said second bridge diagonal points.

4. A substrate temperature stabilizing circuit as recited in claim 3 with additionally nonlinear current limiting means connected in series with said third transistor collector-emitter circuit.

5. A substrate temperature stabilizing circuit as recited in claim 4 wherein said nonlinear current limiting means comprises a field effect transistor having a drain-source circuit serially connected with said third transistor collector-emitter circuit and a gate electrode connected to a common terminal of said field effect transistor and said third transistor.

6. A substrate temperature stabilizing circuit as recited in claim 3 wherein said resistance bridge comprises a first thermistor arm and second, third and fourth resistor arms with additionally a first diode connected in said thermistor arm and a second diode connected in one of said resistor arms.

7. A substrate temperature stabilizing circuit comprising a bridge having at least a thermistor arm and additionally having first and third bridge junction points comprising a first bridge diagonal and second and fourth bridge junction points comprising a second bridge diagonal and including at least a first diode connected in one of said bridge arms; high current gain means comprising oppositely poled first and second transistors having commonly connected emitter electrodes, and base electrodes connecting said transistors across said second bridge diagonal, said first transistor having a collector electrode connected to said first bridge junction point, said second transistor having a collector electrode; and, a third transistor having a base electrode connected to said second transistor collector electrode, and a collector-emitter circuit connected between said third bridge junction point and a junction of said first diode with said one bridge arm, said circuit including a power supply connected across said first and third bridge junction points.

8. A substrate temperature stabilizing circuit as recited in claim 7 with additionally nonlinear current limiting means connected in series with said third transistor collector-emitter circuit.

9. A substrate temperature stabilizing circuit as recited in claim 8 wherein said nonlinear current limiting means comprises a field effect transistor having a drain-source circuit serially connected with said third transistor collector-emitter circuit and a gate electrode connected to a common terminal of said field effect transistor and said third transistor.

10. A microcircuit for automatically stabilizing the temperature of a microcircuit substrate comprising:
an electrical power source;
a resistance bridge having first and second pairs of bridge diagonal points, said power source being connected across said first pair of bridge diagonal points;
an operational amplifier having first and second input ports connected across said second pair of bridge diagonal points, and an output tap;
a first transistor having a base electrode connected to one of said first pair of bridge diagonal points and collector and emitter electrodes;
a second transistor having a base electrode connected to said first transistor emitter electrode, a collector electrode connected to said first transistor collector electrode, and an emitter electrode; and,
a third transistor having a base electrode connected to said output tap, an emitter electrode connected to said second transistor emitter electrode, and a collector electrode, said first, second and third transistors being connected between said first transistor collector electrode and said third transistor collector electrode across said power source.

11. A substrate temperature stabilizing circuit as recited in claim 10 with additionally nonlinear current limiting means connected in series with at least one of said first, second and third transistor collector-emitter circuits.

12. A substrate temperature stabilizing circuit as recited in claim 11 wherein said nonlinear current limiting means comprises a field effect transistor having a drain-source circuit serially connected with said first transistor collector-emitter circuit and a gate electrode connected to a common terminal of said field effect transistor and said first transistor.

13. A substrate temperature stabilizing circuit comprising:
temperature sensor means for generating an electrical signal proportional to the deviation of said substrate temperature from a predetermined temperature;

a power source; and, an operational amplifier means responsive to said electrical signal for generating a control signal, said operational amplifier means including a feedback circuit comprised of a plurality of base-emitter circuits of a plurality of transistors and having collector-emitter circuits connected across said power source, at least one of said transistors being responsive to said control signal for heating said substrate.

14. A substrate temperature stabilizing circuit as recited in claim 13 with additionally nonlinear current limiting means for limiting the maximum current in said substrate heating transistor.

* * * * *